United States Patent
Kim et al.

(10) Patent No.: US 9,477,355 B2
(45) Date of Patent: Oct. 25, 2016

(54) TOUCH PANEL AND DISPLAY

(71) Applicant: LG INNOTEK CO., LTD., Seoul (KR)

(72) Inventors: Jong Sun Kim, Seoul (KR); Dong Keon Lee, Seoul (KR); Ja Ram Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 116 days.

(21) Appl. No.: 14/017,972

(22) Filed: Sep. 4, 2013

(65) Prior Publication Data

US 2015/0062060 A1 Mar. 5, 2015

(51) Int. Cl.
*G06F 3/044* (2006.01)

(52) U.S. Cl.
CPC ...... *G06F 3/044* (2013.01); *G06F 2203/04111* (2013.01)

(58) Field of Classification Search
CPC ............. G06F 2203/0411; G06F 2203/04112; G06F 2203/04113; G06F 2203/041131; G06F 3/044
See application file for complete search history.

(56) References Cited

U.S. PATENT DOCUMENTS

| | | | |
|---|---|---|---|
| 2010/0265193 A1* | 10/2010 | Kung | G06F 3/044 345/173 |
| 2011/0193801 A1* | 8/2011 | Jung et al. | 345/173 |
| 2011/0234519 A1* | 9/2011 | Chan | 345/173 |
| 2012/0313885 A1* | 12/2012 | Cheng et al. | 345/174 |
| 2013/0154979 A1* | 6/2013 | Li et al. | 345/173 |
| 2013/0162547 A1* | 6/2013 | Yoo et al. | 345/173 |
| 2013/0256008 A1* | 10/2013 | Zeng | H01H 11/00 174/257 |
| 2013/0277195 A1* | 10/2013 | Chang et al. | 200/600 |

FOREIGN PATENT DOCUMENTS

| | | |
|---|---|---|
| EP | 2557487 A2 | 2/2013 |
| WO | WO-2012-099394 A2 | 7/2012 |

OTHER PUBLICATIONS

European Search Report dated Feb. 17, 2014 in European Application No. 13181801.5.

* cited by examiner

*Primary Examiner* — Kevin M Nguyen
(74) *Attorney, Agent, or Firm* — Saliwanchik, Lloyd & Eisenschenk

(57) ABSTRACT

Provided are a touch panel and a display, the touch panel, including: a substrate; a connection part formed on the substrate; an insulating part formed on the connection part; a first electrode part electrically connected to the connection part; and a second electrode part insulated with the connection part.

17 Claims, 5 Drawing Sheets

TOUCH PANEL AND DISPLAY

BACKGROUND

1. Field of the Invention

Embodiments of the present invention relate to a touch panel and a display.

2. Description of the Related Arts

A resistive type, an electromagnetic induction type, an optical type, a capacitance method and the like have been used in a touch panel of a mobile terminal. In recent years, a capacitance type touch panel has been widely used In general, the capacitive type touch panel is mainly composed of configurations including two capacitive sensing layers. The two capacitive sensing layers are formed with a space made of an insulating material therebetween. This configuration makes a structure of the touch panel thinner, thereby running counter to miniaturization in size.

Accordingly, to deal with this problem, technologies for reducing two capacitive sensing layers to one layer have been used.

In a touch panel which is configured such that two capacitive sensing layers are reduced to one layer, a first electrode and a second electrode are formed on the same surface of one substrate, an insulating layer is formed on the first electrode and the second electrode using an insulating material, and the second electrodes spaced apart from each other are electrically connected by forming a metal bridge on the insulating layer.

However, the conventional art is problematic that the metal bridge is oxidized or scratched because the metal bridge is exposed. Furthermore, in a case where the metal bridge is formed in a thickness of less than 10 μm, it is problematic that disconnection of a wire is generated due to oxidation or scratches.

BRIEF SUMMARY

Accordingly, the present invention has been made keeping in mind the above problems occurring in the related art. An aspect of embodiments of the present invention provides a touch panel which is configured such that a metal bridge configured to electrically connect sensing electrode pattern parts to each other is located in an inner portion of the touch panel not to be exposed to the outside on that the metal bridge can be inhibited from being oxidized or scratched, thereby inhibiting the disconnection of a wire of the metal bridge from being generated.

Also, another aspect of embodiments of the present invention provides a touch panel that can reduce a production cost while maintaining insulation between a first electrode part and a second electrode part, and can inhibit the disconnection of a wire between a connection part and the first electrode part from being generated even in a case where alignment is dislocated upon formation of the first electrode part due to an error in process upon formation of the first electrode part.

According to an aspect of the present invention, there is provided a touch panel, including: a substrate; a connection part formed on the substrate; an insulating part formed on the connection part; a first electrode part electrically connected to the connection part; and a second electrode part insulated with the connection.

According to one embodiment of the present invention, the first electrode part may be configured to cover a part of an upper surface of the connection part or the insulating part.

According to another embodiment of the present invention, an upper surface of the first electrode part may be formed higher than the upper surface of the connection part or the insulating part.

According to still another embodiment of the present invention, an upper surface of the first electrode part may be formed in the same height as an upper surface of the second electrode part.

According to still further another embodiment of the present invention, the first electrode part may be formed in a peripheral portion on which the connection part or the insulating part is laminated.

According to still further another embodiment of the present invention, the insulating part may be formed to entirely cover the upper surface of the connection part.

According to still further another embodiment of the present invention, the insulating part may be formed to partially cover the upper surface of the connection part.

According to still further another embodiment of the present invention, the touch panel may further include a functional layer formed between the substrate and the connection part.

According to still further another embodiment of the present invention, the functional layer may be any one of a blackened layer, an adhesive layer and a metal seed layer.

According to still further another embodiment of the present invention, the blackened layer may be formed of any one of a metallic oxide, a nitride and a fluoride.

According to still further another embodiment of the present invention, the second electrode part may be imprinted within the insulating part.

According to still further another embodiment of the present invention, the connection part may be formed of any one of a carbon nano tube (CNT), Al, Au, Ag, Sn, Cr, Ni, Ti and Mg.

According to still further another embodiment of the present invention, the connection part may be formed of any one of a metallic oxide, a nitride and a fluoride.

According to still further another embodiment of the present invention, at least one of the connection part, the first electrode part, and the second electrode part may be formed of an opaque metal.

According to still further another embodiment of the present invention, wherein at least one of the connection part, the first electrode part, and the second electrode part may be configured in a mesh form.

According to still further another embodiment of the present invention, the first electrode part or the second electrode part may be formed of any one of an ITO (Indium Tin Oxide), an IZO (Indium Zinc Oxide), a ZnO (Zinc Oxide), a carbon nano tube(CNT), an Ag Nano wire, a conductive polymer, and a graphene.

According to still further another embodiment of the present invention, the substrate may be a transparent widow.

According to another aspect of the present invention, there is provided a display, including: a touch panel composed of a substrate, a connection part formed on the substrate, an insulating part formed on the connection part, a first electrode part electrically connected to the connection part, and a second electrode insulated with the connection part; a driving part configured to apply a driving signal to the touch panel; an LCD module formed on the touch panel; and a polarizing plate formed on the touch panel.

According to one embodiment of the present invention, the substrate may be a transparent window.

According to another embodiment of the present invention, the display may further include a transparent window formed on any one surface of the touch panel, the LCD module and the polarizing plate.

According to still another embodiment of the present invention, e touch panel may be formed between the polarizing plate and the LCD module.

According to the embodiments of the present invention, as the connection part configured to electrically connect sensing electrode pattern parts to each other is located in an inner portion of the touch panel not to be exposed to the outside, the connection part can be inhibited from being oxidized or scratched, thereby inhibiting the disconnection of a wire of the connection part from being generated.

According to the embodiments of the present invention, as a production cost can be reduced while insulation generated between the first electrode part and the second electrode part is maintained, and the disconnection of a wire between the connection part and the first electrode part can be inhibited from being generated even in a case where alignment is dislocated upon formation of the first electrode part due to an error in process upon formation of the first electrode part.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Figure 1:
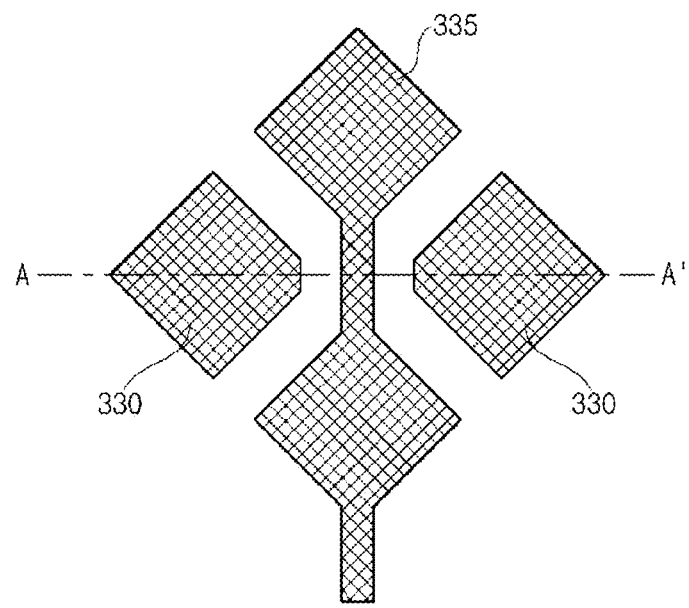
FIG. 1 is a view of a touch panel according to one exemplary embodiment of the present invention.

Hereinafter, preferred embodiments of the present invention will be described in detail with reference to the accompanying drawings. In the following description, it is to be noted that, when the functions of conventional elements and the detailed description of elements related with the present invention may make the gist of the present invention unclear, a detailed description of those elements will be omitted. Further, it should be understood that the shape and size of the elements shown in the drawings may be exaggeratedly drawn to provide an easily understood description of the structure of the present invention rather than reflecting the actual sizes of the corresponding elements.

Figure 2:
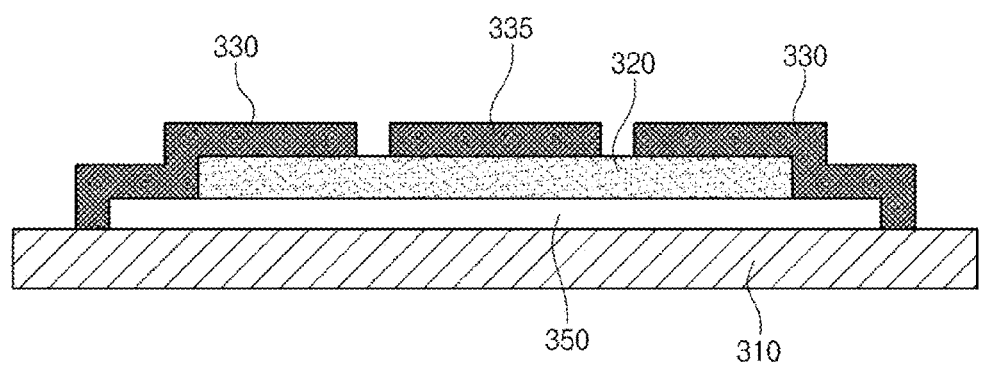
FIG. 2 is a cross-sectional view of a touch panel along A-A' from FIG. 1 according to one embodiment of the present invention.

FIG. 1 is a view of a touch panel according to one exemplary embodiment of the present invention and FIG. 2 is a cross-sectional view of a touch panel along A-A' from FIG. 1 according to one embodiment of the present invention.

A touch panel according to one embodiment of the present invention will be explained with reference to FIG. 1 and FIG. 2.

As illustrated in FIG. 2, the touch panel according to the one embodiment of the present invention includes: a substrate 310; a connection part 350; an insulating part 320; a first electrode part 330; and a second electrode part 335.

According to the present embodiment of the invention, as illustrated in FIG. 2, the connection part 350 is formed on the substrate 310.

At this time, the substrate 310 may be composed of a transparent window, and the connection part 350 may be formed of any one of a carbon nano tube (CAT), Al, Au, Ag, Sn, Cr, Ni, Ti and Mg.

Alternately, the connection part 350 may be formed of any one of a metallic oxide, a nitride and a fluoride.

Meanwhile, at least one of the connection part 350, the first electrode part 330, and the second electrode part 335 may be configured in a mesh form. As such, when at least one of the connection part 350, the first electrode part 330, and the second electrode part 335 is configured in the mesh form, visibility of the touch panel may be improved. The insulating part 320 may be formed in an upper portion of the connection part 350 formed as above.

The insulating part 320 is an element configured to insulate the connection part 350 and the second electrode part 335.

In the present embodiment as shown in FIG. 2, the second electrode part 335 and the first electrode part 330 may be formed in an upper portion of the insulating part 320.

More specifically, the first electrode part 330 is formed all over the substrate 310, the connection part 320 and the insulating part 320, and the first electrode parts are connected to each other via the connection part.

That is, the connection part 350 is formed on the substrate 310 to connect the first electrode parts 330 to each other, and the connection part 350 is configured such that it is insulated with the second electrode part 335 by the insulating part 320.

Meanwhile, the first electrode part 330 and the second electrode part 335 may be formed of any one of an ITO (Indium Tin Oxide), an IZO (Indium Zinc Oxide), a ZnO (Zinc Oxide), a carbon nano tube (CNT), an Ag Nano wire, a conductive polymer, and a graphene.

Alternately, at least one of the connection part 350, the first electrode part 330, and the second electrode part 335 may be formed of an opaque metal.

Meanwhile, a display according on another embodiment of the present invention may include the touch panel configured as above.

More specifically, the display may include: the touch panel; a driving part configured to apply a driving signal to the touch panel; an LCD module formed on the touch panel; and a polarizing plate formed on the touch panel, wherein the touch panel may be composed of, as explained above with reference to FIG. 2, the substrate 310; the connection part 350 formed on the substrate; the insulating part 320 formed on the connection part 350; the first electrode part 330 electrically connected to the connection part; and the second electrode part 335 insulated with the connection part 350.

At this time, the substrate 310 may be composed of a transparent window. The display may further include a transparent window formed on any one surface of the touch panel, the LCD module and the polarizing plate.

At this time, the touch panel may be formed between the polarizing plate and the LCD module.

As reviewed above, in the touch panel and the display according to the one embodiment and the other embodiment of the present invention, as the connection part 350 configured to electrically connect the first electrode parts 330 to each other is located in an inner part of the touch panel not to be exposed to the outside, the connection part 350 can be inhibited from being oxidized or being scratched, thereby inhibiting the disconnection of a wire of the connection part 350 from being generated.

Figure 3:
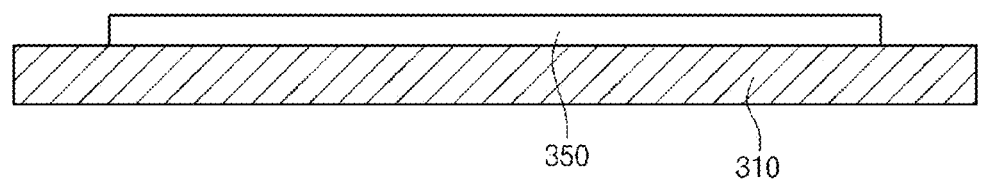
FIG. 3 through FIG. 5 are cross-sectional views for explaining a method of manufacturing the touch panel according to the one embodiment of the present invention.
Figure 4:
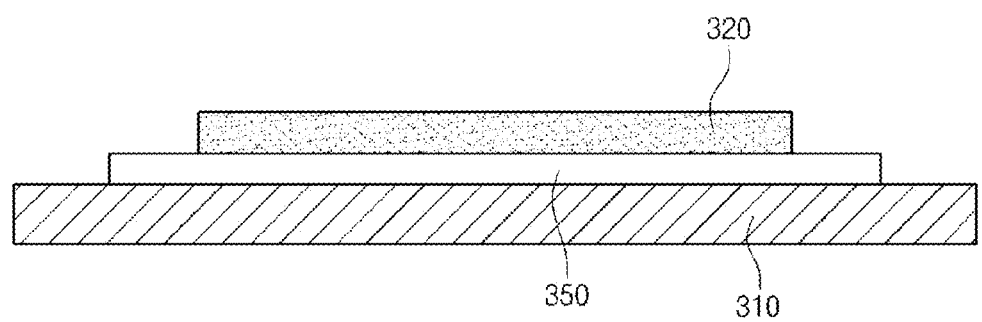
Figure 5:
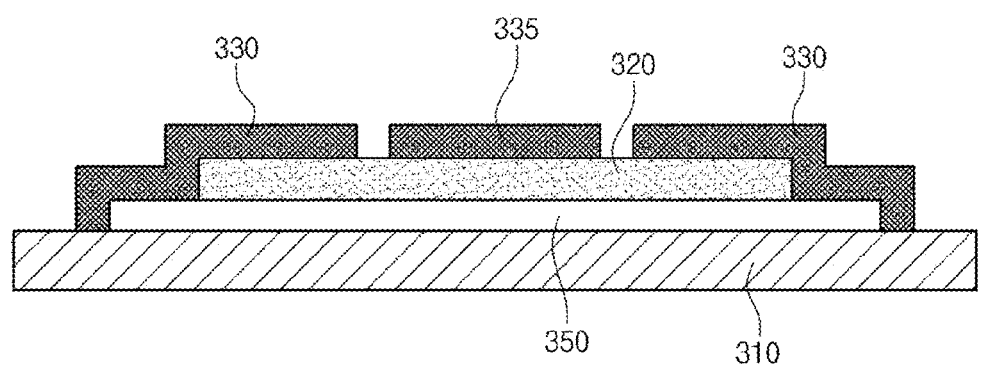

FIG. 3 through FIG. 5 are cross-sectional views for explaining a method of manufacturing the touch panel according to the one embodiment of the present invention.

A method of manufacturing the touch panel according to the one embodiment of the present invention with reference to FIG. 3 to FIG. 5.

As illustrated in FIG. 3, the connection part 350 is formed on the substrate 310.

After this, as illustrated in FIG. 4, the insulating part 320 is formed in the upper portion of the connection part 350.

As illustrated in FIG. 5, the first electrode part 330 and the second electrode part 335 are formed in the upper portion of the insulating part 320 formed as above.

Accordingly, the connection part 350 connects electrically the first electrode parts 330 to each other.

That is, the connection part 350 is formed in an upper part of the substrate 310 to electrically connect the first electrode parts to each other, and the connection part 350 is insulated with the second electrode part 335 by the insulating part 320.

Accordingly, according to the present embodiment of the invention, as the connection part configured to electrically connect sensing electrode pattern parts to each other is located in the inner portion of the touch panel not to be exposed to the outside, the connection part can be inhibited from being oxidized or scratched, thereby inhibiting the disconnection of a wire of the connection part from being generated.

FIG. 6 through FIG. 14 are cross-sectional views of a touch panel according to the other embodiments of the present invention.

Figure 6:
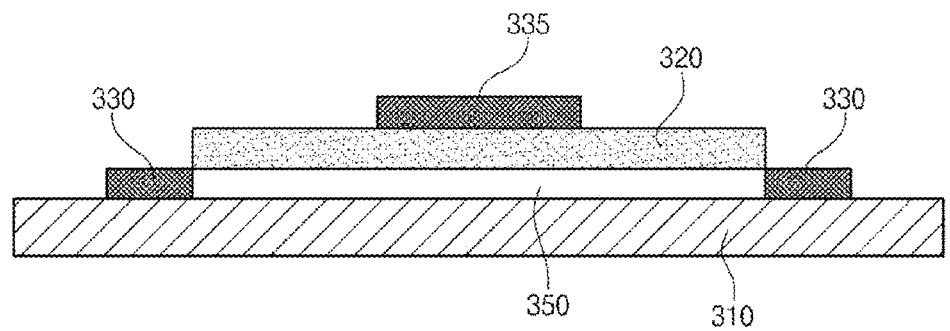
FIG. 6 through FIG. 14 are cross-sectional views of a touch panel according to the other embodiments of the present invention.

In still another embodiment of FIG. 6, the connection part 350 is formed on the substrate 310, and the insulating part 320 is formed to entirely cover an upper surface of the connection part 350.

The first electrode part 330 is formed in a peripheral portion of the connection part 350 to thereby be connected to the connection part 330, and the second electrode part 335 is formed in the upper portion of the insulating part 320.

Like the present embodiment of FIG. 6, when the insulating part 320 is formed to entirely cover the upper surface of the insulating part 350, by minimizing exposure of the connection part 350, the connection part can be more actively inhibited from being oxidized or being scratched.

Figure 7:
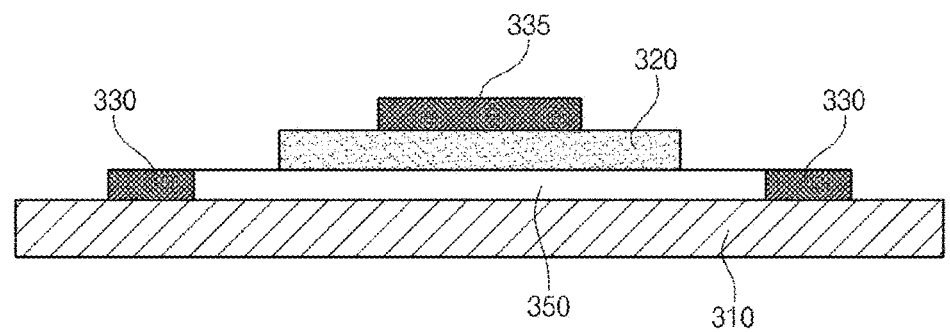

In still further another embodiment of FIG. 7, the connection part 350 is formed on the substrate 310, and the insulating part 320 is formed on the connection part 350 so that the insulating part 320 can cover a part of the upper surface of the connection part 320.

As such, when the insulating part 320 is formed only on the part of the upper surface of the connection part 350, it is effective to reduce a production cost while maintaining insulation between the first electrode part 330 and the second electrode part 335.

Figure 8:
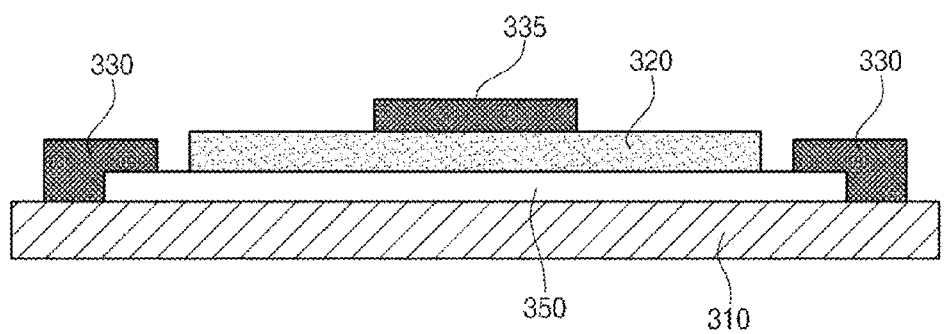

In still further another embodiment of FIG. 8, the connection part 350 is formed on the substrate 310, the insulating part 320 is formed in the upper portion of the connection part 350, and thereafter, the first electrode part 330 and the second electrode part 335 are formed such that the first electrode part 330 may be formed to partially overlap and cover the upper portion of the connection part 350.

As such, when the first electrode part 330 is formed to partially overlap and cover the upper portion of the connection part 350, the disconnection of a wire between the connection part 350 and the first electrode part 330 is not generated even in a case where alignment is dislocated upon formation of the first electrode part due to an error in process upon the formation of the first electrode part.

Figure 9:
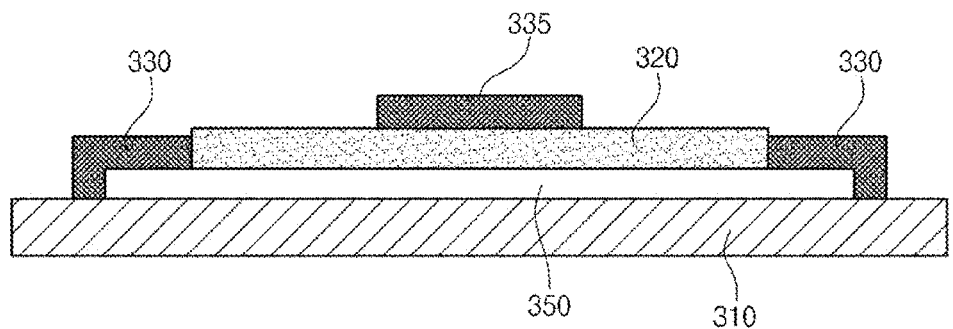

In still further another embodiment of FIG. 9, the connection part 350 is formed on the substrate 310, the insulating part 320 is formed in the upper portion of the connection part 350, and thereafter, the first electrode part 330 and the second electrode part 335 are formed such that the connection part 350 is entirely covered by the insulating part 320 and the first electrode part 330.

As such, when the connection part 350 is entirely covered by the insulating part 320 and the first electrode part 330, by minimizing the exposure of the connection part 350, the connection part can be inhibited from being oxidized or being scratched.

Figure 10:
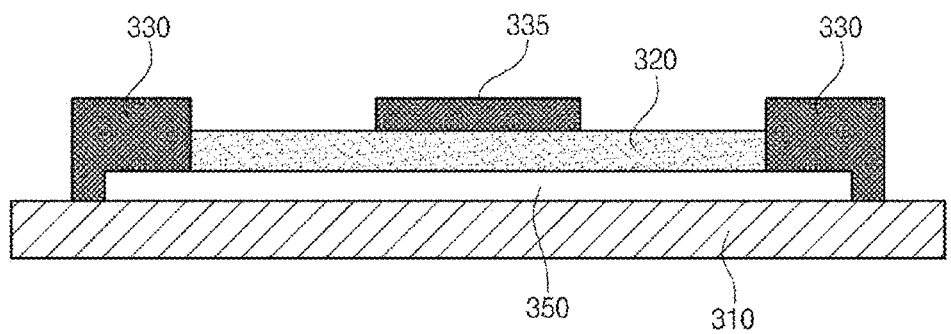

In still further another embodiment of FIG. 10, the connection part 350 is formed on the substrate 310, the insulating part 320 is formed in the upper portion of the connection part 350, and thereafter, the first electrode part 330 and the second electrode part 335 are formed such that each of upper surfaces of the first electrode part 330 and second electrode part 335 is formed in the same height as each other.

As such, when each of the upper surfaces of the first electrode part 330 and second electrode part 335 is formed in the same height as each other, it is advantageous that a process can be easily performed, and a thickness of the touch panel can be more uniformly formed.

Figure 11:
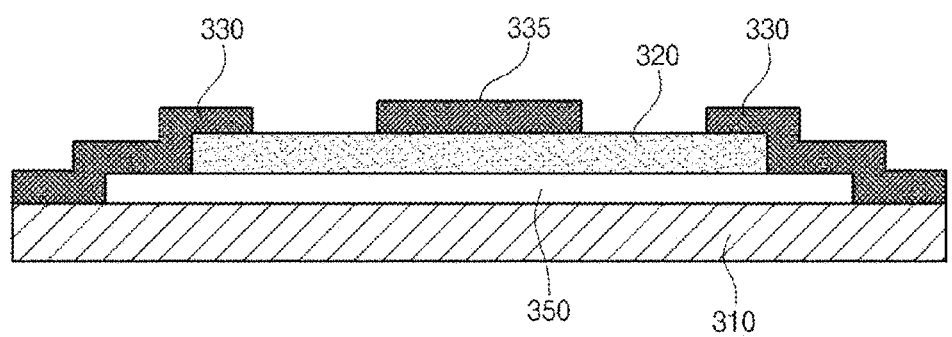

In still further another embodiment of FIG. 11, the connection part 350 is formed on the substrate 310, the insulating part 320 is formed in the upper portion of the connection part 350, and thereafter, the first electrode part 330 and the second electrode part 335 are formed such that a part of the insulating part 320 and the connection part 330 are covered by the first electrode part 330.

As such, when the part of the insulating part 320 and the connection part 330 are covered by the first electrode part 330, it is advantageous that the connection part 330 can be more stably protected, and the disconnection of a wire is not generated even in a case where an error in alignment between the connection part 350 and the first electrode part 330 is generated.

Figure 12:
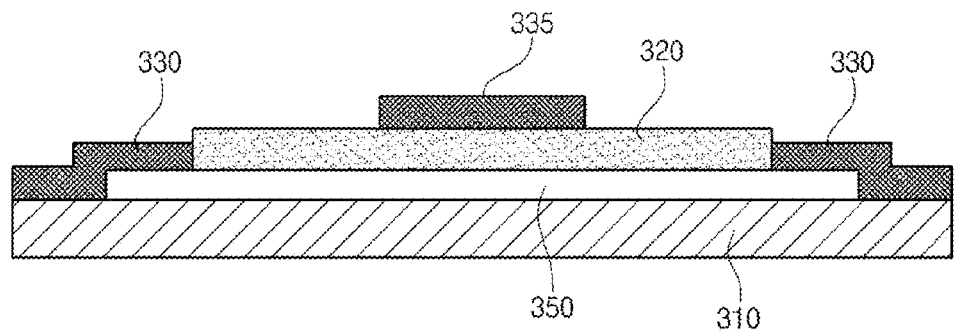

In still further another embodiment of FIG. 12, the connection part. 350 is formed on the substrate 310, the insulating part 320 is formed in the upper portion of the connection part 350, and thereafter, the first electrode part 330 and the second electrode part 335 are formed such that the insulating part 320 is not covered by the first electrode part 330, and a wider area than before of the substrate 310 is covered by the first electrode part 330.

As such, when the insulating part 320 is not covered by the first electrode part 330, and the wider area than before of the substrate 310 is covered by the first electrode part 330, the insulating part 320 can be formed in a smaller area than before, and the connection part 350 can be more efficiently protected.

Figure 13:
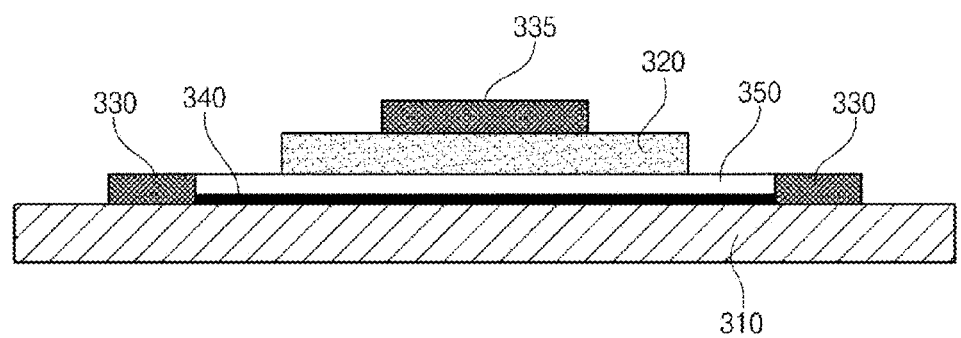

In still further another embodiment of FIG. 13, the functional layer 340 is formed on the substrate 310, and the connection part 350 is formed on the functional layer 340. Also, the insulating part 320 is formed in the upper portion of the connection part 350, and thereafter, the first electrode part 330 and the second electrode part 335 are formed.

The functional layer 340 may be composed of any one of a blackened layer, an adhesive layer and a metal seed layer.

When the functional layer 340 is the blackened layer, the functional layer 340 may be formed of any one of a metallic oxide, a nitride and a fluoride. The blackened layer can inhibit the connection part 340 from being visible.

Meanwhile, when the functional layer 340 is the adhesive layer, the functional layer may more stably adhere the connection part 350 to the substrate 310. When the functional layer 340 is the metal seed layer, the functional layer may enable the connection layer 350 to be more easily formed on the substrate 310 upon formation of the connection layer 350 and to be stably adhered and fixed to the substrate.

Figure 14:
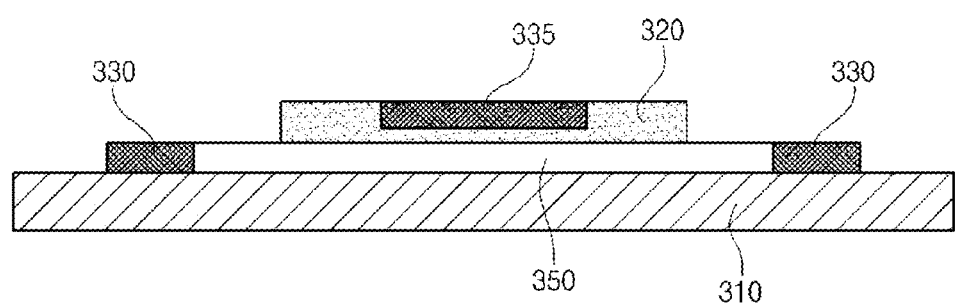

In still further another embodiment of FIG. 14, the connection part 350 is formed on the substrate 310, the insulating part 320 is formed in the upper portion of the connection part 350, and thereafter, the first electrode part 330 and the second electrode part 335 are formed such that a groove is formed in the insulating part 320 so that the second electrode part 335 can be imprinted within the insulating part 320.

As such, when the second electrode part 335 is formed in such a manner that it is imprinted within the insulating part, the second electrode part 335 is exposed so that it can be inhibited from being damaged.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A touch panel, comprising:
   a substrate;
   a connection part formed on the substrate;
   an insulating part formed and entirely covering an upper surface of only the connection part;
   a first electrode part electrically connected to the connection part; and
   a second electrode part insulated from the connection part;
   wherein the connection part is configured to have a mesh form, and
   wherein only one side of the first electrode part is in direct contact with one side of the connection part.

2. The touch panel of claim 1, wherein the first electrode part is formed in a peripheral portion of the connection part.

3. The touch panel of claim 1, wherein the connection part is formed of any one of a carbon nano tube (CNT), Al, Au, Ag, Sn, Cr, Ni, Ti and Mg.

4. The touch panel of claim 1, wherein the connection part is formed of any one of a metallic oxide, a nitride and a fluoride.

5. The touch panel of claim 1, wherein at least one of the connection part, the first electrode part, and the second electrode part is formed of an opaque metal.

6. The touch panel of claim 1, wherein at least one of the first electrode part and the second electrode part is configured in a mesh form.

7. The touch panel of claim 1, wherein the first electrode part or the second electrode part is formed of any one of an ITO (Indium Tin Oxide), an IZO (Indium Zinc Oxide), an ZnO (Zinc Oxide), a carbon nano tube (CNT), an Ag nano wire, a conductive polymer, and a graphene.

8. The touch panel of claim 1, wherein the substrate is a transparent window.

9. The touch panel of claim 1, wherein an upper surface of the first electrode part is formed in the same height as that of the connection part.

10. The touch panel of claim 1, wherein an upper surface of the second electrode part is formed higher than that of the first electrode part.

11. The touch panel of claim 1, wherein the second electrode part is formed in an upper portion of the insulating part.

12. The touch panel of claim 1, wherein the second electrode part is formed to cover a part of an upper surface of the insulating part.

13. The touch panel of claim 1, wherein the first electrode part is in direct contact with the substrate.

14. The touch panel of claim 1, wherein the insulating part and the connection part are interposed between the second electrode part and the substrate.

15. A display, comprising:
   a touch panel comprising: a substrate; a connection part formed on the substrate; an insulating part formed and entirely covering an upper surface of only the connection part; a first electrode part electrically connected to the connection part; and a second electrode part insulated from the connection part, wherein the connection part is configured to have a mesh form, wherein only one side of the first electrode part is in direct contact with one side of the connection part;
   a driving part configured to apply a driving signal to the touch panel;
   an LCD module formed on the touch panel; and
   a polarizing plate formed on the touch panel.

16. The display of claim 15, wherein the substrate is a transparent window.

17. The display of claim 15, further comprising a transparent window formed on any one surface of the touch panel, the LCD module and the polarizing plate.

* * * * *